April 28, 1936.   J. W. SWENDSEN   2,039,199
DEVICE FOR REGULATING THE AIR GAP BETWEEN THE STATOR
AND ROTOR IN DYNAMO MACHINES HAVING ANNULAR ELEMENTS
Filed Sept. 3, 1935

J. W. Swendsen
INVENTOR

By: Glascock Downing Seebold
Attys.

Patented Apr. 28, 1936

2,039,199

UNITED STATES PATENT OFFICE 2,039,199

DEVICE FOR REGULATING THE AIR-GAP BETWEEN THE STATOR AND ROTOR IN DYNAMO MACHINES HAVING ANNULAR ELEMENTS

Johan Walfred Swendsen, Oslo, Norway

Application September 3, 1935, Serial No. 39,018 In Norway, Germany, and Great Britain July 31, 1934

3 Claims. (Cl. 171—252)

The present invention relates to a dynamo-electric machine of the kind in which both the stator element and the rotor elements have an annular form, and in which a rotor element is disposed on each side of the stator in the axial direction.

The object of the invention is to provide a practical and expedient device for adjusting very correctly the air-gaps between the stator and the two rotor elements, without making internal measurements.

According to the invention a dynamo-electric machine comprises an annular stator and an annular rotor on both sides of the stator, a shaft to which the rotors are secured, bearings in which the shaft is mounted so as to be incapable of axial movement relative to said bearings, which are adapted to be adjusted axially relative to the dynamo-electric machine casing.

Further constructional details and the preferred form of the mounting of the shaft will be apparent from the description given hereinafter with reference to the accompanying drawing, which shows an induction motor as a constructional example of the invention.

Figure 1:
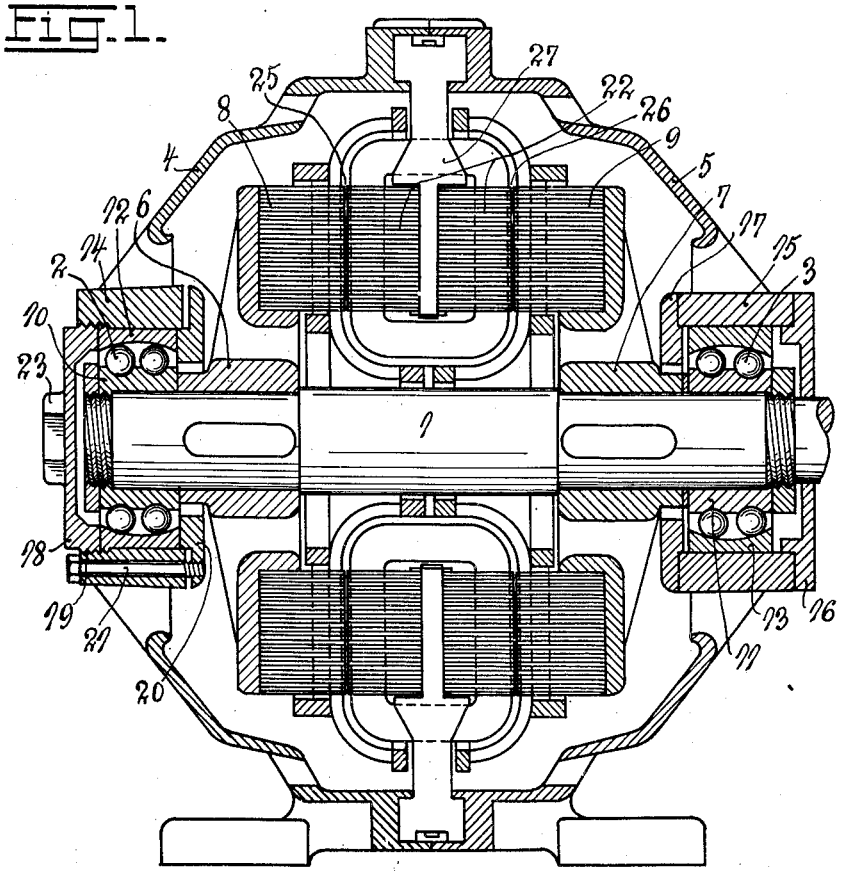

In the drawing, Figure 1 shows a section through an induction motor, and

Figure 2:
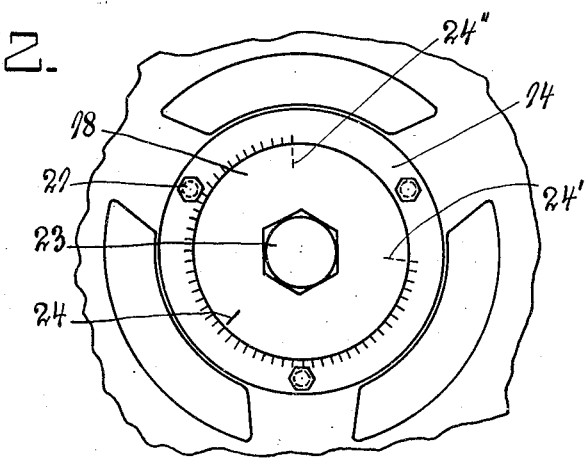

Figure 2 shows a fragment of one end of the motor seen from outside.

Referring to the drawing, 1 is the shaft of the motor and is mounted in bearings 2, 3. These bearings are of the thrust type and hence prevent any axial movement of the shaft 1 relatively to the bearings 2, 3. The bearings 2, 3 are mounted in the motor casing comprising two parts 4 and 5, which are connected together in any suitable manner (not shown). Mounted on the shaft 1 are hubs 6, 7 carrying the rotor elements 8, 9 of the annular type.

There is furthermore disposed in the motor casing, between the rotor elements 8, 9, an annular stator 22 which is secured to the motor casing 4, 5 by means of the supporting devices 27. On each side of the stator, between the latter and the rotor elements 8, 9, are formed the customary air-gaps 25, 26. The inner races 10, 11 of the bearings 2, 3 are secured to the shaft 1, by being for example, shrunk on, and the outer races 12, 13 are guided in an axially slidable manner in the rings 14, 15, in the motor casing.

On the right hand side of the drawing, the bearing is protected outwardly by means of a plate 16 and inwardly by means of a plate 17. The distance between the said plates is made such that the bearing can slide as a whole, together with the shaft 1, in the axial direction. On this side, the shaft 1 also projects and may there be connected with a driving device, such as for example a belt pulley or a gear wheel.

The bearing 2 on the left hand side of the drawing is clamped between an outer plate 18, which is secured by screw threads 19 to the ring 14 on the motor casing, and an inner plate 20, which may be tightened by means of bolts 21, so that the race 12 is pressed against the inner side of the ring 18. For adjusting the ring 18 in the axial direction of the motor, the said ring may be provided with a nut-like projection 23, the purpose of which is described hereinafter.

The adjusting device as described in the foregoing is employed as follows for obtaining equal air-gaps between the stator and the two rotor elements 8, 9:—

After the motor has been completely assembled, the ring 18 is loosened and the screws 21 are tightened until the rotor element 9 bears against the stator 22, which is observed by the fact that the screws 21 become fast. Thereupon, the ring 18 is screwed until this is also fast.

Previously, a graduated scale may have been provided on the outside of the ring 18 and the outside of the ring 14 on the motor casing, as shown in Figure 2, the said graduated scale indicating directly the magnitude of the air-gap, a fixed index being provided on the ring 18. If no graduated scale is provided, the two parts 18 and 14 may have distinguishing marks in the above-described position.

If a graduated scale is provided on the ring 14, it may be assumed that the index mark 24 in the position in which the rotor element 9 bears against the stator is situated at 24'. The screws 21 are now slackened, and the ring 18 is screwed inwardly until the rotor element 8 bears against the side of the stator. It may then be assumed that the index 24 is situated in the position 24''. For a correct adjustment of the air-gaps between the rotor elements and the stator core, the ring 18 is thereupon screwed back until the index 24 is situated midway between the two points 24' and 24''. After this position has been found, the screws 21 are tightened, whereupon the ring 20 clamps the bearing 2 fast, and the air-gaps between the rotor elements and the stator are fixed once and for all.

It will be understood that the individual features of the adjusting device may be varied according to the kind of dynamo machine for which the invention is to be applied, and that the invention is therefore not limited by the exact form of construction described in the foregoing.

I claim:

1. A dynamo-electric machine having a casing, an annular stator and an annular rotor on both sides of the stator in the said casing forming an air-gap between the said stator and each of the said rotors in axial direction on both sides of the said stator, a shaft to which the two rotors are secured in non-movable relation, bearings carried by the said housing and in which the said shaft is mounted, means to prevent axial movement between one of the said bearings and the said shaft and means to adjust the said one bearing axially relative to the said dynamo-electric machine casing and the said stator fixed thereto.

2. A dynamo-electric machine having a casing, an annular stator and an annular rotor on both sides of the stator in the said casing forming an air-gap between the said stator and each of the said rotors in axial direction on both sides of the said stator, a shaft to which the two rotors are secured in non-movable relation, a thrust bearing carried by the said housing in which the said shaft is clamped and means to adjust the said bearing axially relative to the said dynamo-electric machine casing and the said stator fixed thereto, said means comprising a plate screwed axially into the casing and a plate bolted to the casing, said plates being arranged one on each side of the said thrust bearing and being adapted to secure said bearing in place in non-movable relation to the said casing.

3. A dynamo-electric machine having a casing and an annular stator fixed therein, and rotor elements arranged fixed on a common shaft on each side of the said stator with an air-gap in between, means for axial adjustment of the said rotors and the said shaft in relation to the said stator and the said casing, said means comprising a thrust bearing, a plate screwed axially into the casing, and a plate bolted to the casing, said plates being arranged one on each side of the said thrust bearing and being adapted to secure said bearing in place in non-movable relation to the said casing, the angular position of the first mentioned plate being visible from the outside and the said casing on the outside being provided with a graduation whereby the magnitude of the air-gaps formed by the stator and the rotors is indicated.

JOHAN WALFRED SWENDSEN.